(12) United States Patent
Shigemura

(10) Patent No.: US 10,887,529 B2
(45) Date of Patent: Jan. 5, 2021

(54) DISPLAY CONTROL DEVICE AND DISPLAY CONTROL METHOD

(71) Applicant: DENSO CORPORATION, Kariya (JP)

(72) Inventor: Shusaku Shigemura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/778,378

(22) PCT Filed: Nov. 17, 2016

(86) PCT No.: PCT/JP2016/084019
§ 371 (c)(1),
(2) Date: May 23, 2018

(87) PCT Pub. No.: WO2017/090499
PCT Pub. Date: Jun. 1, 2017

(65) Prior Publication Data
US 2018/0376079 A1   Dec. 27, 2018

(30) Foreign Application Priority Data

Nov. 25, 2015   (JP) .................. 2015-229910

(51) Int. Cl.
*H04N 5/262*   (2006.01)
*B60R 21/00*   (2006.01)
(Continued)

(52) U.S. Cl.
CPC ............. *H04N 5/2625* (2013.01); *B60R 1/00* (2013.01); *B60R 1/002* (2013.01); *B60R 21/00* (2013.01);
(Continued)

(58) Field of Classification Search
CPC ........... B60R 1/00; B60R 1/002; B60R 21/00; B60R 2300/105; B60R 2300/303;
(Continued)

(56) References Cited

U.S. PATENT DOCUMENTS

2006/0140508 A1\* 6/2006 Ohgishi .................... G06T 1/00
382/284
2006/0274147 A1\* 12/2006 Chinomi ............... G06T 3/4038
348/118
(Continued)

FOREIGN PATENT DOCUMENTS

JP       2007-243463      \*  9/2007
JP       2007-243463 A       9/2007
(Continued)

*Primary Examiner* — Alexander Gee
(74) *Attorney, Agent, or Firm* — Maschoff Brennan

(57) ABSTRACT

An image processing unit generates a corrected bird's-eye-view image that is a captured bird's-eye-view image and that is a bird's-eye-view image from which irradiation light present in the captured image has been removed. The corrected bird's-eye-view image is generated as a bird's-eye-view image representing a difference between the captured bird's-eye-view image and a difference image that is an image representing a change in a pixel value of the captured bird's-eye-view image. The image processing unit generates a corrected history image that is a bird's-eye-view image obtained by combining the corrected bird's-eye-view images while shifting positions of the corrected bird's-eye-view images on the basis of a movement amount of the own vehicle. The image processing unit generates a corrected display image that is a bird's-eye-view image obtained by combining the corrected history image and the latest captured bird's-eye-view image, and makes a display unit display the corrected display image.

5 Claims, 8 Drawing Sheets

(51) Int. Cl.
*B60R 1/00* (2006.01)
*H04N 7/18* (2006.01)
*G06T 3/40* (2006.01)
*G06T 5/50* (2006.01)
*H04N 5/247* (2006.01)
*H04N 5/445* (2011.01)
*G06T 5/00* (2006.01)

(52) U.S. Cl.
CPC ............ *G06T 3/4038* (2013.01); *G06T 5/005* (2013.01); *G06T 5/50* (2013.01); *H04N 5/247* (2013.01); *H04N 5/2628* (2013.01); *H04N 5/445* (2013.01); *H04N 7/18* (2013.01); *H04N 7/181* (2013.01); *B60R 2300/105* (2013.01); *B60R 2300/303* (2013.01); *B60R 2300/607* (2013.01); *G06T 2207/10016* (2013.01); *G06T 2207/30252* (2013.01)

(58) Field of Classification Search
CPC .... B60R 2300/607; G06T 2207/10016; G06T 2207/30252; G06T 3/4038; G06T 5/005; G06T 5/50; H04N 5/247; H04N 5/2625; H04N 5/2628; H04N 5/445; H04N 7/18; H04N 7/181
USPC ................... 348/148, 118; 345/649; 382/103
See application file for complete search history.

(56) References Cited

U.S. PATENT DOCUMENTS

| | | | |
|---|---|---|---|
| 2009/0097708 A1* | 4/2009 | Mizuta | B60R 11/04 382/103 |
| 2011/0001793 A1* | 1/2011 | Moriyama | H04N 13/398 348/46 |
| 2011/0043632 A1* | 2/2011 | Satoh | B60R 1/00 348/148 |
| 2013/0329045 A1* | 12/2013 | Choi | H04N 5/2254 348/148 |
| 2014/0002660 A1* | 1/2014 | Takahashi | B60R 1/00 348/148 |
| 2014/0247357 A1* | 9/2014 | Sekiguchi | H04N 5/225 348/148 |
| 2015/0070394 A1* | 3/2015 | Yanagawa | G06T 5/50 345/649 |
| 2015/0142263 A1* | 5/2015 | Hirai | G06K 9/00791 701/36 |

FOREIGN PATENT DOCUMENTS

| | | |
|---|---|---|
| JP | 2011-022952 A | 2/2011 |
| JP | 2013-246493 A | 12/2013 |

* cited by examiner

DISPLAY CONTROL DEVICE AND DISPLAY CONTROL METHOD

CROSS-REFERENCE TO RELATED APPLICATION

This application is based on and claims the benefit of priority from PCT Application No. PCT/JP2016/084019, filed on Nov. 17, 2016, and Japanese Patent Application No. 2015-229910 filed on Nov. 25, 2015, the disclosures of which is incorporated herein by reference.

TECHNICAL FIELD

The present disclosure relates to a display control device and a display control method.

BACKGROUND ART

Recently, there has been known a technique that repeatedly captures images of a predetermined range in a periphery of a vehicle with an in-vehicle camera mounted in the vehicle, converts a captured image into a bird's-eye-view image at a viewpoint of looking downward from above the vehicle, and displays the bird's-eye-view image using a display unit in the vehicle.

Such a technique includes a history image combining technique of widening an image display range in a periphery of a vehicle by displaying, on a display unit, an image obtained by combining a bird's-eye-view image of the latest captured image and a bird's-eye-view image of the past captured image. For example, Patent Literature 1 (PTL 1) discloses a technique of preventing expansion of a shadow of an own vehicle in an image of the display unit along with the movement of the vehicle in the history image combining technique.

With a technique disclosed in PTL 1, the in-vehicle camera is a rear camera for capturing a rear view behind the vehicle, and an actual region and a history region are provided in a storage unit (a predetermined storage region). An actual region A is a region for storing an image of a predetermined range more distant from the vehicle among portions obtained by dividing the rear view behind the vehicle in a longitudinal direction. An actual region B is a region for storing an image in a predetermined range closer to the vehicle. A history region C is a region for storing a bird's-eye-view image outside a capture range of the in-vehicle camera.

A history region B is a region for storing a bird's-eye-view image of the same range as the actual region B. In a case where the actual region B includes a shadow, a bird's-eye-view image is configured in the history region B so that current arrangement of the periphery of the vehicle is present in the bird's-eye-view image in the history region B. Specifically, the bird's-eye-view image is configured in the history region B by use of the bird's-eye-view image stored in the actual region A, on the basis of the movement amount of the vehicle. Further, the bird's-eye-view image is configured in the history region C by use of the bird's-eye-view image stored in the history region B, on the basis of the movement amount of the vehicle.

As described above, in the case where the actual region B includes a shadow, history image combining is performed by use of the bird's-eye-view image in the history region B configured based on the bird's-eye-view image in the actual region A having a high possibility of no shadow. This prevents expansion of a shadow of the own vehicle in the display image along with the movement of the vehicle in the technique disclosed in PTL 1.

CITATION LIST

Patent Literature

[PTL 1] JP 2013-246493 A

SUMMARY OF THE INVENTION

Technical Problem

In the history image combining technique, the above-described problem of expansion may occur not only in a shadow of the vehicle but also in irradiation light of the vehicle. The irradiation light of the vehicle includes irradiation light of a head lamp, irradiation light of a tail lamp or the like.

Such irradiation light reaches farther compared with a shadow. Hence, for example, with the configuration described in PTL 1 mentioned above, the irradiation light of the vehicle may be present not only in the bird's-eye-view image of the actual region B but also in the bird's-eye-view image of the actual region A. In this case, the irradiation light of the vehicle may expand along with the movement of the vehicle in the display image, even if the history image combination is performed by use of the bird's-eye-view image of the history region B configured based on the bird's-eye-view image of the actual region A.

The present disclosure aims at preventing expansion of the irradiation light of the vehicle on the image of the display unit in the history image combining technique.

Solution to Problem

One aspect of a technology of the present disclosure is a display control device (50) for displaying, on a display unit (40) mounted in the vehicle, a captured image of a predetermined range in a periphery of the vehicle, and includes an acquisition unit (S21, S41), a first image generation unit (S23, S43), a second image generation unit (S26), a calculation unit (S24, S44), a corrected history generation unit (S25, S27, S28), a corrected display generation unit (S29), and a corrected display processing unit (S30). The acquisition unit repeatedly acquires a captured image from an in-vehicle camera (110, 120) mounted in the vehicle. The first image generation unit sequentially generates a captured bird's-eye-view image that is a bird's-eye-view image of the captured image. The second image generation unit sequentially generates a corrected bird's-eye-view image that is a bird's-eye-view image of the captured image and that is a bird's-eye-view image from which irradiation light (70, 71) of the vehicle present in the captured image has been removed. The calculation unit calculates a movement amount of the vehicle. The corrected history generation unit generates a corrected history image that is a bird's-eye-view image obtained by combining the corrected bird's-eye-view images sequentially generated by the second image generation unit while shifting positions of the corrected bird's-eye-view images on the basis of the movement amount. The corrected display generation unit generates a corrected display image that is a bird's-eye-view image obtained by combining the corrected history image and the latest captured bird's-eye-view image. The corrected display processing unit makes the display unit display the corrected display image. The second image generation unit generates, as the corrected bird's-eye-view image, at least one of the following bird's-eye-view images. Specifically, the second image generation unit generates a bird's-eye-view image obtained by applying bird's-eye-view conversion to an image representing a difference between the captured image having the irradiation light and a first difference image that is an image representing a change in a pixel value of the captured image by the irradiation light. Further, the second image generation unit generates a bird's-eye-view image representing a difference between the captured bird's-eye-view image having the irradiation light and a second difference image (80, 81) that is an image representing a change in a pixel value of the captured bird's-eye-view image by the irradiation light. The second image generation unit generates, as the corrected bird's-eye-view image, at least one of such the bird's-eye-view images.

Further, another aspect of the technology of the present disclosure is a display control method in a display control device (50) for displaying, on a display unit (40) in the vehicle, a captured image of a predetermined range in a periphery of the vehicle, and includes an acquisition step (S21, S41), a first image generation step (S23, S43), a second image generation step (S26), a calculation step (S24, S44), a corrected history generation step (S25, S27, S28), a corrected display generation step (S29), and a corrected display processing step (S30). The acquisition step repeatedly acquires a captured image from an in-vehicle camera (110, 120) mounted in the vehicle. The first image generation step sequentially generates a captured bird's-eye-view image that is a bird's-eye-view image of the captured image. The second image generation step sequentially generates a corrected bird's-eye-view image that is a bird's-eye-view image of the captured image and that is a bird's-eye-view image from which irradiation light (70, 71) of the vehicle present in the captured image has been removed. The calculation step calculates a movement amount of the vehicle. The corrected history generation step generates a corrected history image that is a bird's-eye-view image obtained by combining the corrected bird's-eye-view images sequentially generated by the second image generation unit while shifting positions of the corrected bird's-eye-view images on the basis of the movement amount. The corrected display generation step generates a corrected display image that is a bird's-eye-view image obtained by combining the corrected history image and the latest captured bird's-eye-view image. The corrected display processing step makes the display unit display the corrected display image. The second image generation step generates, as the corrected bird's-eye-view image, at least one of the following bird's-eye-view images. Specifically, the second image generation step generates a bird's-eye-view image obtained by applying bird's-eye-view conversion to an image representing a difference between the captured image having the irradiation light and a first difference image that is an image representing a change in a pixel value of the captured image by the irradiation light. Further, the second image generation step generates a bird's-eye-view image representing a difference between the captured bird's-eye-view image having the irradiation light and a second difference image (80, 81) that is an image representing a change in a pixel value of the captured bird's-eye-view image by the irradiation light. The second image generation step generates, as the corrected bird's-eye-view image, at least one of such the bird's-eye-view images.

With such a configuration, it is possible to prevent expansion of the irradiation light of the vehicle on the image of the display unit. That is, assuming a case of generating a bird's-eye-view image obtained by combining the captured bird's-eye-view images having the irradiation light of the vehicle while shifting positions of the captured bird's-eye-view images on the basis of the movement amount of the vehicle, the irradiation light of the vehicle in the bird's-eye-view image is expanded along with the movement of the vehicle. Therefore, if such a bird's-eye-view image is combined with the latest captured bird's-eye-view image to be displayed on the display unit, the irradiation light of the vehicle expands along with the movement of the vehicle in the display image.

The technology of the present disclosure generates a corrected history image obtained by combining the corrected bird's-eye-view images from which the irradiation light of the vehicle has been removed while shifting positions of the corrected bird's-eye-view images on the basis of the movement amount of the vehicle, and generates a corrected display image by use of the corrected history image. With such a configuration, it is possible to prevent expansion of the irradiation light of the vehicle on the image of the display unit.

Note that symbols within parentheses described in this item column and Claims indicate a correspondence relationship with concrete means described in embodiments mentioned below as one aspect of the technology of the present disclosure. Therefore, it does not limit the technical scope of the present disclosure.

DESCRIPTION OF EMBODIMENTS

Embodiments for carrying out one aspect of a technology of the present disclosure will be described below with reference to drawings.

1. Configuration

Figure 1:
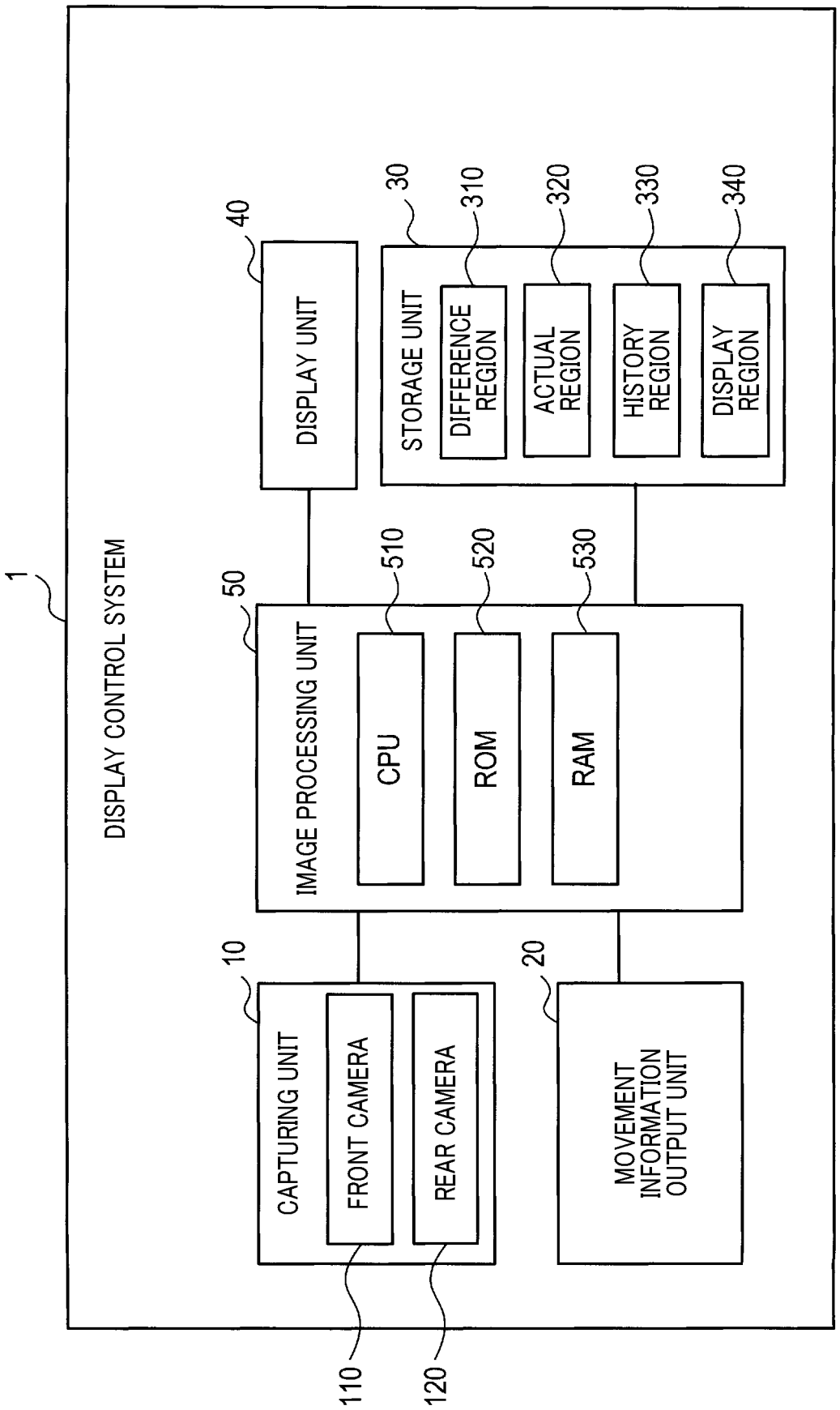
FIG. 1 is a block diagram showing one example of a configuration of a display control system.

As shown in FIG. 1, a display control system 1 according to the present embodiment is mounted in the vehicle and includes a capturing unit 10, a movement information output unit 20, a storage unit 30, a display unit 40, and an image processing unit 50.

In the following, a vehicle having the display control system 1 mounted therein will be referred to as "an own vehicle".

The capturing unit 10 includes a front camera 110 and a rear camera 120.

The front camera 110 is an in-vehicle camera mounted at a front (for example, at an upper center inside a windshield) of the own vehicle. The front camera 110 captures images of a predetermined range ahead of the vehicle in the periphery of the own vehicle.

The rear camera 120 is an in-vehicle camera mounted at a rear (for example, at a center in a lateral direction at a rear end of the own vehicle) of the own vehicle. The rear camera 120 captures images of a predetermined range behind the vehicle in the periphery of the own vehicle.

The front camera 110 and the rear camera 120 repeatedly perform capturing at a predetermined cycle (for example, 30 frames/second), and output captured images to the image processing unit 50.

The movement information output unit 20 is a device configured to output movement information detected by sensors mounted in the own vehicle to the image processing unit 50. In the present embodiment, the movement information is information necessary for calculating a movement amount of the own vehicle. The movement amount referred to herein indicates a change in a position or a direction of the own vehicle in a predetermined period. The movement information includes information on a pulse counter, a steering angle, or a yaw rate of a wheel, information on a shift range, and the like.

The storage unit 30 is a device (memory) configured to be capable of storing information, such as an image, in a predetermined region.

The display unit 40 is a device (display) configured to be capable of displaying an image. The display unit 40 is provided at a position where a crew (for example, a driver) of the own vehicle can visually recognize a displayed image. The display unit 40 includes a touch panel for performing operation by directly touching a screen.

The image processing unit 50 includes a micro-computer including a CPU 510, a ROM 520, a RAM 530 and the like. In the image processing unit 50, the CPU 510 executes display control processing including image processing, and the like (display control processing to be described below), according to a program stored in the ROM 520.

2. Processing

The display control processing executed by the image processing unit 50 will be described below.

First, an outline of the display control processing will be described. The display control processing is processing for displaying, on the display unit 40, a bird's-eye-view image centering on the own vehicle. Specifically, the display control processing is processing for displaying, on the display unit 40, a bird's-eye-view image representing an entire circumference of the own vehicle including the right and left sides of the own vehicle, which is outside the capture range of the capturing unit 10, in addition to the front and rear of the own vehicle, which are the capture range of the capturing unit 10. The bird's-eye-view image referred to herein indicates an image at a viewpoint of looking straight from above the own vehicle or obliquely downward from above the own vehicle. In a display bird's-eye-view image that is a bird's-eye-view image displayed on the display unit 40, a history portion that is a portion outside the capture range of the capturing unit 10 is configured by use of the history image. As shown in a display bird's-eye-view image of FIG. 2, a history portion 60 is positioned at the right and left sides of an icon 61 indicating the own vehicle. Note that, the history portion 60 is indicated by a dotted line in FIG. 2 for the sake of explanation, but the dotted line is actually not displayed on the display unit 40. The history image referred to herein indicates a bird's-eye-view image obtained by combining bird's-eye-view images sequentially generated based on the captured images while shifting the positions of the bird's-eye-view images, on the basis of the movement amount of the own vehicle.

In the history image thus generated, for example, if it is generated by use of a bird's-eye-view image reflecting the irradiation light of the own vehicle, irradiation light, which does not actually exist, appears in the history portion 60. As a result, in the display bird's-eye-view image, a portion of irradiation light is expanded along with the movement of the own vehicle. Hence, in the display control processing according to the present embodiment, image processing for preventing the irradiation light and the like from appearing in the history portion 60 is executed. Specifically, in the display control processing, one of the difference processing and the mask processing is selectively executed.

The difference processing generates a bird's-eye-view image from which the irradiation light has been removed, by subtracting only the influence of the irradiation light from the bird's-eye-view image of the captured image having the irradiation light. Then, this processing generates a history image on the basis of the generated bird's-eye-view image. Thereby, this processing prevents the irradiation light from appearing in the history portion.

On the other hand, the mask processing generates a history image on the basis of the bird's-eye-view image of the captured image having the irradiation light. Then, this processing masks a region where the irradiation light is displayed, in the generated history image. Thereby, this processing prevents the irradiation light from appearing in the history portion.

[2.1. Display Control Processing]

Figure 3:
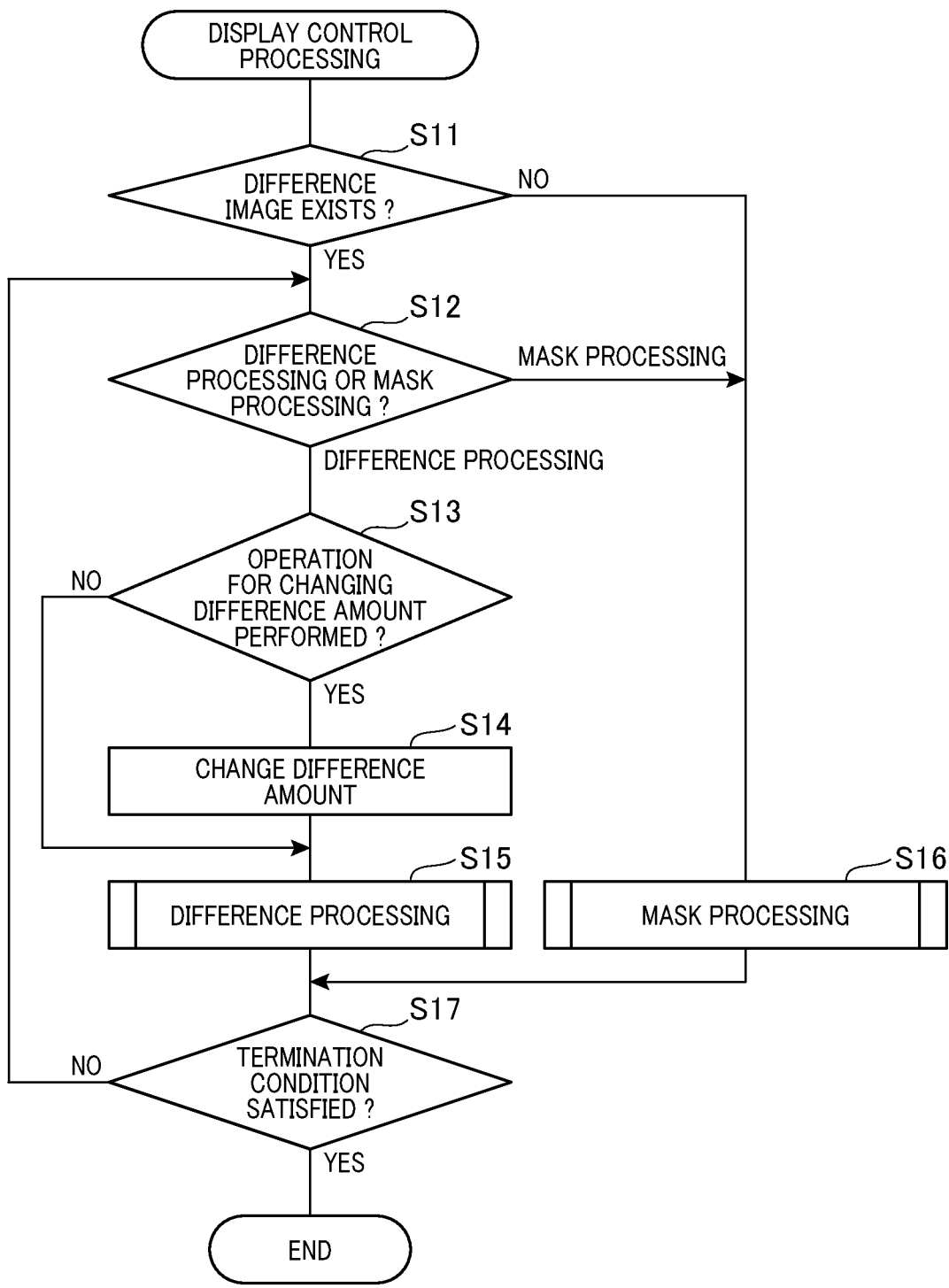
FIG. 3 is a flowchart of display control processing.
Figure 4:
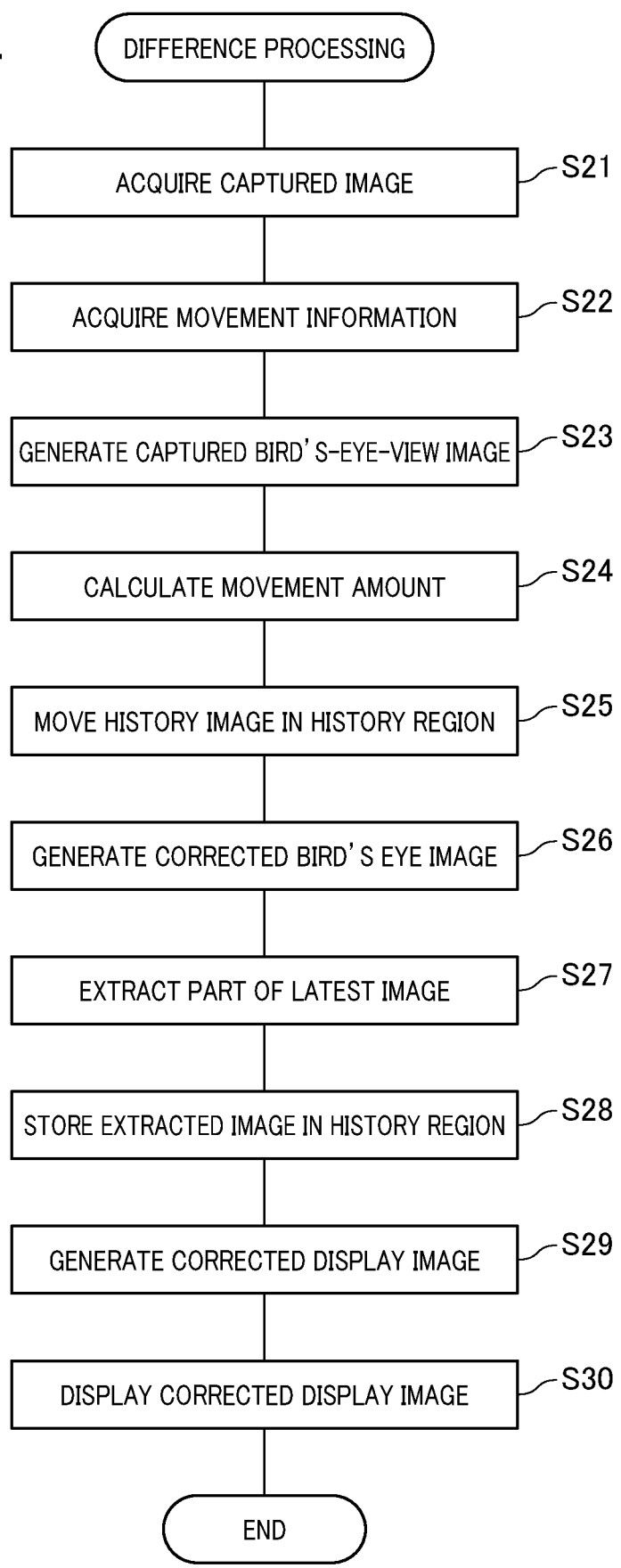
FIG. 4 is a flowchart of the difference processing in a display control.
Figure 5:
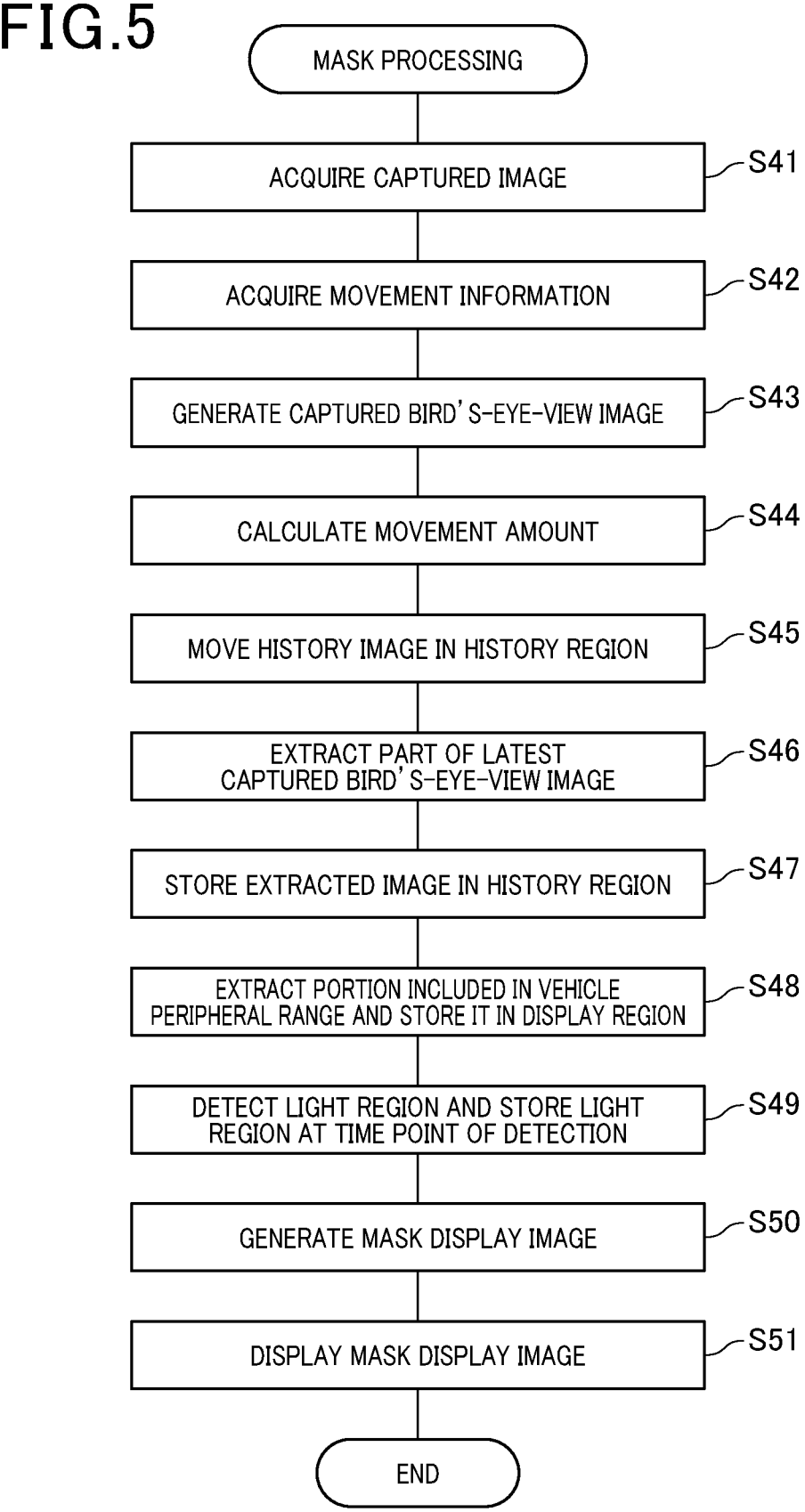
FIG. 5 is a flowchart of mask processing in the display control.

The detail of the display control processing will be described below with reference to FIG. 3 to FIG. 5. The display control processing is, as described above, processing executed by the image processing unit 50 (CPU 510) included in the display control system 1 according to a predetermined program. In addition, the display control processing is started by lighting of at least one of a head lamp and a tail lamp of the own vehicle during a period in which an ignition switch of the own vehicle is ON. Note that, in the following description, the bird's-eye-view image of the captured image is referred to as a "captured bird's-eye-view image".

The image processing unit 50 determines whether there exists a difference image (step S11). The difference image referred to herein is an image used for difference processing and is an image representing a change in a pixel value of the captured bird's-eye-view image by the irradiation light of the own vehicle. In other words, the difference image is an image representing a difference in the pixel value of the captured bird's-eye-view image between presence and absence of the irradiation light of the own vehicle.

Specifically, the difference image is an image as described below. Even if a capturing target is the same image, a pixel vale of a portion having the irradiation light changes due to presence and absence of the irradiation light. The pixel value referred to herein is a value for each pixel constituting an image, and is a brightness value in the present embodiment. Hence, in two images which are different only in presence or absence of the irradiation light, it is possible to obtain an image in which only the influence of the irradiation light appears, by subtracting a value of each pixel (pixel value) constituting an image not having the irradiation light from a value of each pixel constituting an image having the irradiation light. This image is the difference image. Thereby, in the display control processing according to the present embodiment, it is possible to generate an image as if not having the irradiation light, by subtracting the difference image from the image having the irradiation light.

Figure 2:
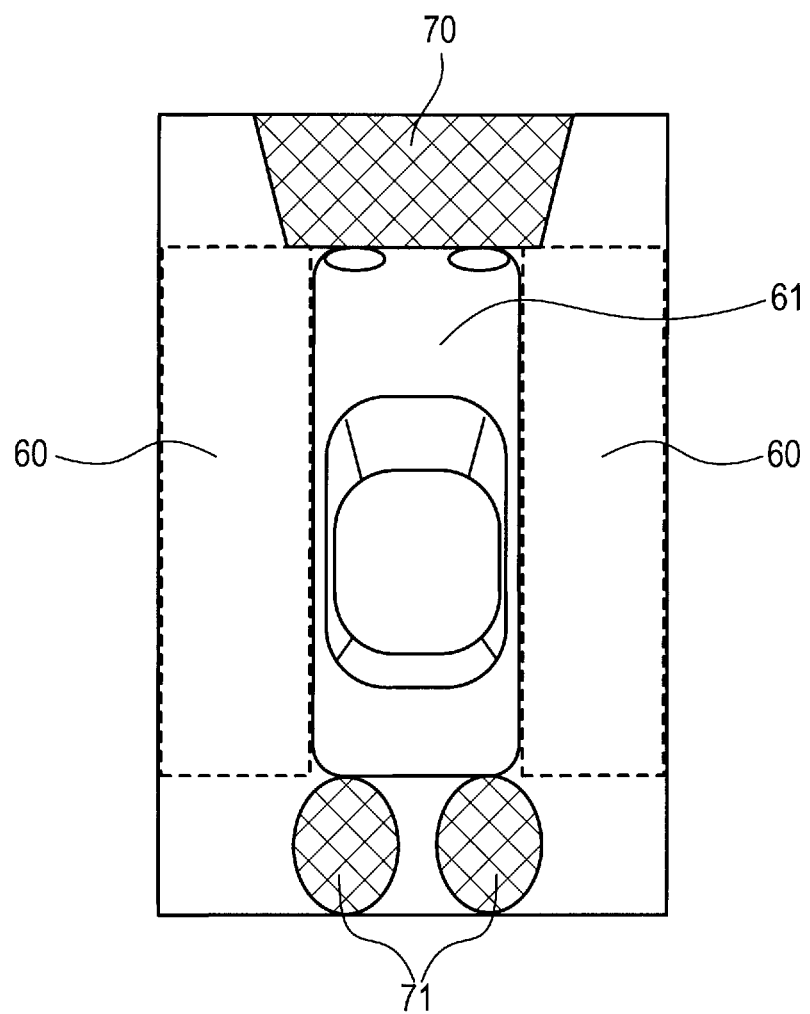
FIG. 2 is a diagram representing one example of a bird's-eye-view image which is generated in difference processing and displayed on a display unit.
Figure 6:
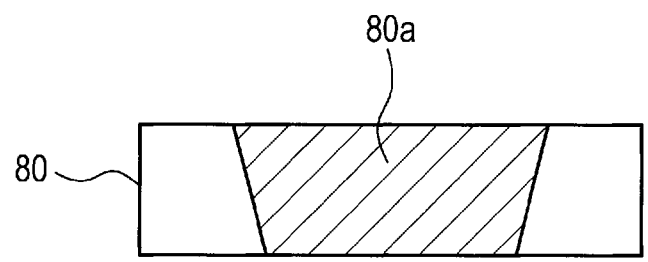
FIG. 6 is a diagram representing one example of a difference image for subtracting an influence of light of a head lamp from a bird's-eye-view image of a captured image of a front camera.
Figure 7:
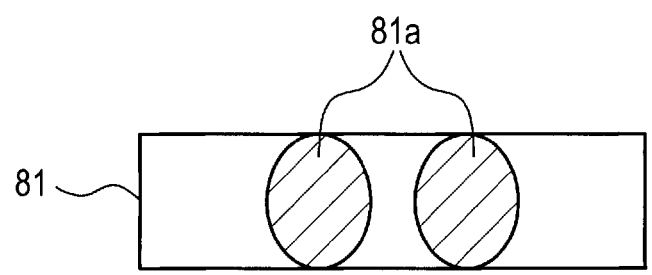
FIG. 7 is a diagram representing one example of a difference image for subtracting an influence of light of a tail lamp from a bird's-eye-view image of a captured image of a rear camera.

In the present embodiment, as shown in FIG. 2, light 70 of the head lamp is assumed as the irradiation light captured by the front camera 110. In addition, in the present embodiment, light 71 of the tail lamp is assumed as the irradiation light captured by the rear camera 120. Hence, in the present embodiment, for example, a difference image 80 as shown in FIG. 6 and a difference image 81 as shown in FIG. 7 are preliminarily prepared. Specifically, the difference image 80 shown in FIG. 6 is an image for subtracting the influence of the light 70 of the head lamp from the captured bird's-eye-view image of the front camera 110. The difference image 80 has a portion (portion where the irradiation light appears) 80a where the light 70 of the head lamp appears. In addition, the difference image 81 shown in FIG. 7 is an image for subtracting the influence of the light 71 of the tail lamp from the captured bird's-eye-view image of the rear camera 120. The difference image 81 has a portion (portion where the irradiation light appears) 81a where the light 71 of the tail lamp appears.

The two types of images for difference 80, 81 are preliminarily stored in a difference region 310 that is a predetermined storage region provided in the storage unit 30. Note that, the two types of images for difference 80, 81 stored in the difference region 310 can be updated at a sales store (automobile dealer), a factory, and the like.

The image processing unit 50 determines that the difference image exists, in a case where the difference region 310 stores both of the two types of images for difference 80, 81. On the other hand, the image processing unit 50 determines that the difference image does not exist, in a case where at least one of the two types of images for difference 80, 81 is not stored. One example of a case of determining that the images for difference 80, 81 do not exist includes a case where when the storage unit 30 is replaced (when the memory is replaced), it is replaced with a new one that does not store the two types of images for difference 80, 81, and the like. The image processing unit 50, in a case of having determined that the difference image exists (YES at step S11), control proceeds to step S12. On the other hand, the image processing unit 50, in a case of having determined that the difference image does not exist (NO at step S11), control proceeds to step S16.

The image processing unit 50 determines which one of the difference processing and the mask processing has been selected (step S12). In the present embodiment, a user can select the difference processing or the mask processing. Specifically, the user can select a processing by operating a touch panel (user interface) of the display unit 40. Thus, the image processing unit 50 performs determination processing of step S12 on the basis of an operation status (selection result) of the user. The image processing unit 50, in a case of having determined that the difference processing is selected (step S12: difference processing), control proceeds to step S13. On the other hand, the image processing unit 50, in a case of having determined that the mask processing is selected (step S12: mask processing), control proceeds to step S16.

The image processing unit 50 determines whether an operation of changing a difference amount between the image having the irradiation light and each of the two types of images for difference 80, 81 has been performed by the user (step S13). The operation of changing a difference amount is performed, for example, in the following case. When the difference between the image having the irradiation light and each of the two types of images for difference 80, 81 is calculated, the pixel value is not always subtracted by an appropriate amount. Specifically, in a case of calculating a difference by using the images for difference 80, 81, depending on the brightness around the own vehicle, there is a case where from the image having the irradiation light, too large a value is subtracted from the pixel value (subtracted too much), or too little a value is subtracted from the pixel value (subtracted too little). In such a case, an image having an inappropriate pixel value (an image with distortion) is displayed on the display unit 40. The processing of step S13 and step S14 to be described below is processing for a user having viewed such an image with distortion to change the difference amount (difference amount adjusting processing). In the display control processing according to the present embodiment, a user can change the difference amount by operating the touch panel (user interface) of the display unit 40. Therefore, the image processing unit 50 performs the determination processing of step S13 on the basis of the operation status (change result) of the user.

Note that, the display of the image onto the display unit 40 is performed in the difference processing to be described below (processing of step S30 shown in FIG. 4). Therefore, as described below, normally, in the processing of steps S12 to S17 repeatedly executed according to a predetermined cycle, it is assumed that the first processing of step S13 does not determine that the operation of changing the difference amount has been performed.

In the image processing unit 50, in a case of having determined that the operation of changing the difference amount has been performed (YES at step S13), control proceeds to step S14. On the other hand, the image processing unit 50, in a case of having determined that the operation of changing the difference amount has not been performed (NO at step S13), skips the processing of step S14, and control proceeds to step S15.

The image processing unit 50 changes a difference amount between the image having the irradiation light and each of the two types of images for difference 80, 81 (step S14). Specifically, the image processing unit 50 changes the pixel value of each of the two types of images for difference 80, 81. In the two types of images for difference 80, 81, the pixel value of each of portions 80a, 81a where the irradiation light appears is larger than zero, and the pixel value of the other portions is zero. Therefore, the image processing unit 50 changes magnifying powers of the pixel values of the two types of images for difference 80, 81, respectively (changed to 0.9 times, 1.1 times or the like), and substantially changes the pixel value of only a portion having the irradiation light. With this operation, in the display control processing according to the present embodiment, the difference amount between the image having the irradiation light and each of the two types of images for difference 80, 81 is changed by use of the two types of images for difference 80, 81 in which the pixel values have been changed.

The image processing unit 50 executes the difference processing (processing shown in FIG. 4) (step S15). The detail of the difference processing will be described below.

The image processing unit 50 control proceeds to step S17 after executing the processing of step S15.

Further, the image processing unit 50 executes the mask processing (processing shown in FIG. 5) (step S16). This processing is executed in a case where the above-described determination processing of step S11 performs a negative determination or in a case where the above-described determination processing of step S12 determines that mask processing is necessary. The detail of the mask processing will be described below. The image processing unit 50 control proceeds to step S17 after executing the processing of step S16.

The image processing unit 50 determines whether a termination condition of the display control processing has been satisfied (step S17). The image processing unit 50 determines that the termination condition has been satisfied in a case where an ignition switch of the own vehicle is OFF or in a case where both of the head lamp and the tail lamp are turned off.

The image processing unit 50, in a case of having determined that the termination condition has been satisfied (YES at step S17), terminates the display control processing. On the other hand, the image processing unit 50, in a case of having determined that the termination condition has not been satisfied (NO at step S17), returns to the above-described determination of step S12, and executes again the processing of step S12 and subsequent steps.

[2.2. Difference Processing]

Next, the above-described difference processing executed in step S15 will be described with reference to FIG. 4.

The image processing unit 50 acquires the latest captured image from each of the front camera 110 and the rear camera 120 (step S21).

The image processing unit 50 acquires movement information from the movement information output unit 20 (step S22).

The image processing unit 50 applies well-known image conversion (bird's-eye-view conversion) to the latest captured image acquired by the processing of step S21, to generate a captured bird's-eye-view image corresponding to each of the front camera 110 and the rear camera 120 (step S23). At this time, the image processing unit 50 extracts a portion necessary for generating a display bird's-eye-view image from the generated captured bird's-eye-view image, and stores the extracted image in an actual region 320 that is a predetermined storage region provided in the storage unit 30. Note that, in the following, the captured bird's-eye-view image of the front camera 110 is referred to as a "forward captured bird's-eye-view image" and the captured bird's-eye-view image of the rear camera 120 is referred to as a "backward captured bird's-eye-view image".

The image processing unit 50 calculates a movement amount of the own vehicle on the basis of movement information acquired by the processing of step S22 (step S24). The movement amount of the own vehicle referred to herein indicates a change in the position and direction of the own vehicle during a period from an acquisition timing of a previous captured image to an acquisition timing of a current captured image (acquisition interval of the captured image).

The image processing unit 50 moves a history image stored in a history region 330 on the basis of the movement amount of the own vehicle calculated by the processing of step S24 (step S25).

Figure 8:
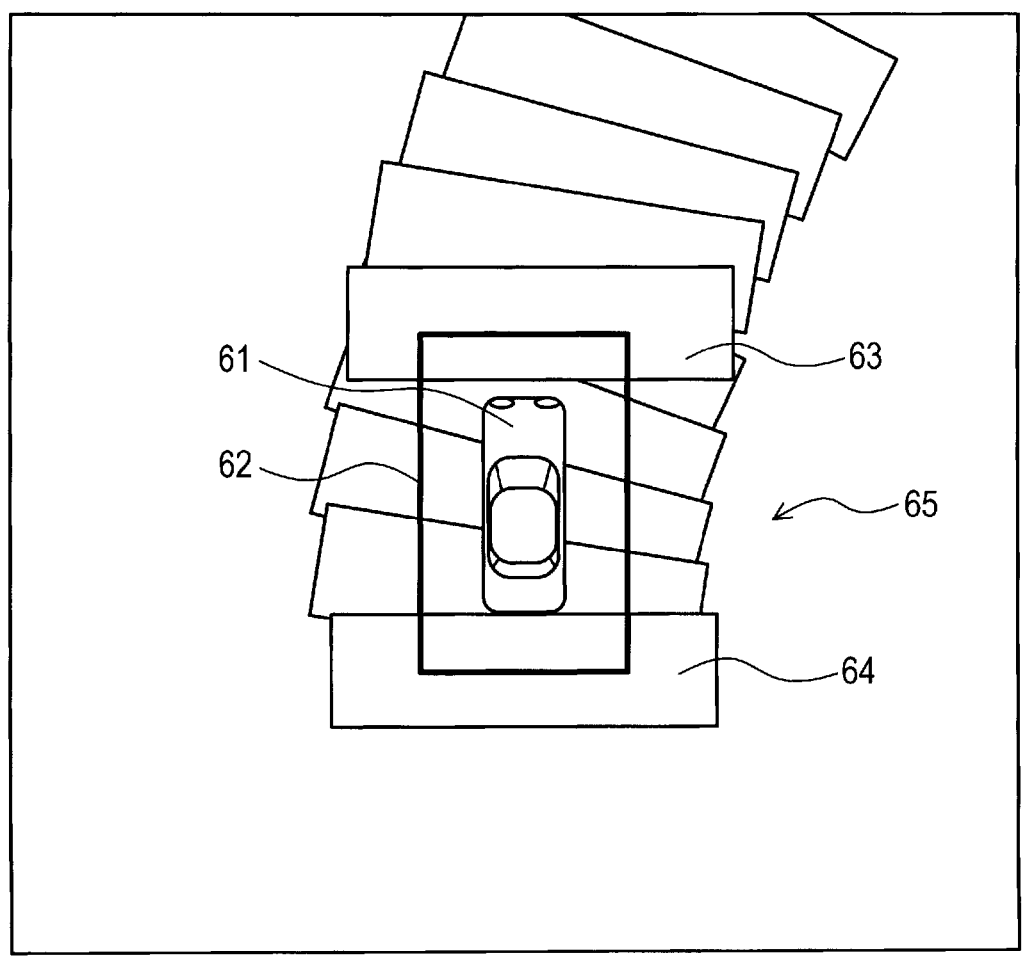
FIG. 8 is a diagram illustrating a history image.

The history region 330 referred to herein is a predetermined storage region provided in the storage unit 30, and stores the history image. As shown in FIG. 8, the history region 330 is designed to be capable of storing a range one size larger than a vehicle peripheral range 62 that is a range including not only the front and rear of the own vehicle but also the right and left sides of the own vehicle. In FIG. 8, for the sake of explanation, the icon 61 indicating the own vehicle is shown, but actually, the display control processing according to the present embodiment does not store the icon 61 in the history region 330. In addition, the image processing unit 50, in the processing of step S25, moves a history image 65 so that a position based on the own vehicle changes. Note that, the history image 65 is generated by being stored in the history region 330 by the processing of step S28 to be described below. Therefore, a history image of a target of movement does not exist in the first processing of step S25.

The image processing unit 50 generates a corrected bird's-eye-view image (step S26). The corrected bird's-eye-view image referred to herein is a bird's-eye-view image from which the irradiation light present in the captured bird's-eye-view image has been removed. The corrected bird's eye image is generated by calculating a difference between the captured bird's-eye-view image having the irradiation light and each of the two types of images for difference 80, 81. In other words, the corrected bird's-eye-view image is generated as an image representing a difference between the captured bird's-eye-view image having the irradiation light and each of the two types of images for difference 80, 81. Note that, in a case where in the above-described processing of step S14, the pixel values of the two types of images for difference 80, 81 have been changed (in a case where the difference amount has been changed), the difference is calculated by use of the images for difference 80, 81 after the change. In the display control processing according to the present embodiment, the corrected bird's-eye-view image is generated as follows. Specifically, the image processing unit 50 generates the forward corrected bird's-eye-view image in which the light 70 of the head lamp present in the captured image by the front camera 110 has been removed from the forward captured bird's-eye-view image. Additionally, the image processing unit 50 generates the backward corrected bird's-eye-view image in which the light 71 of the tail lamp present in the captured image by the rear camera 120 has been removed from the backward captured bird's-eye-view image.

In the display control processing according to the present embodiment, the determination on whether the irradiation light is present in the forward captured bird's-eye-view image and the backward captured bird's-eye-view image is performed based on ON/OFF of the switches of the head lamp and tail lamp. Specifically, in a case where the switch of the head lamp is ON, it is determined that the light 70 of the head lamp is present in the forward captured bird's-eye-view image. On the other hand, in a case where the switch of the head lamp is OFF, it is determined that the light 70 of the head lamp is not present in the forward captured bird's-eye-view image. The determination on whether the irradiation light is present in the backward captured bird's-eye-view image is also performed similarly. Specifically, in a case where the switch of the tail lamp is ON, it is determined that the light 71 of the tail lamp is present in the backward captured bird's-eye-view image. On the other hand, in a case where the switch of the tail lamp is OFF, it is determined that the light 71 of the tail lamp is not present in the backward captured bird's-eye-view image.

In the display control processing according to the present embodiment, the corrected bird's-eye-view image is generated for an image determined to include the irradiation light of the forward captured bird's-eye-view image and the backward captured bird's-eye-view image. On the other hand, the corrected bird's-eye-view image is not generated for an image determined not to include the irradiation light.

The image processing unit 50 extracts a portion necessary for generating a display bird's-eye-view image from the latest corrected bird's-eye-view image generated by the processing of step S26 (step S27). Further, the image processing unit 50 extracts a portion necessary for generating a display bird's-eye-view image from the latest corrected bird's-eye-view image for an image for which the corrected bird's-eye-view image has not been generated by the processing of step S26 of the forward captured bird's-eye-view image and the backward captured bird's-eye-view image.

The image processing unit 50 stores the image extracted by the processing of step S27 in the history region 330 (step S28). At this time, the image processing unit 50, in a state in which the history image 65 is not stored in the history region 330 (for example, the first processing), stores the extracted image in the history region 330 as the history image 65. On the other hand, the image processing unit 50, as shown in FIG. 8, in a state in which the history image 65 is stored in the history region 330 (for example, the second and subsequent processing), overwrites latest extracted images 63, 64 on the history image 65 stored in the history region 330. With this operation, the image processing unit 50 combines the history image 65 and the latest extracted images 63, 64 to update the history image 65. The latest extracted image 63 is stored at a current position corresponding to the front of the own vehicle in the history region 330. Additionally, the latest extracted image 64 is stored at a current position corresponding to the rear of the own vehicle in the history region 330.

In this way, in the difference processing according to the present embodiment, executed are the processing of moving the history image 65 on the basis of the movement amount of the own vehicle, and the processing of overwriting the image extracted from the corrected bird's-eye-view image on the history image 65 after the movement. In the difference processing according to the present embodiment, these processing steps are repeatedly executed, and thereby the corrected history image is generated as the history image 65 in the history region 330. Specifically, the corrected history image, which is a bird's-eye-view image obtained by combining sequentially-generated corrected bird's-eye-view images while shifting positions of the corrected bird's-eye-view images on the basis of the movement amount of the own vehicle, is generated as the history image 65 in the history region 330.

As described above, there is also a case where one of the latest extracted images 63, 64 (two images) is a captured bird's-eye-view image not having the irradiation light. In the present embodiment, the corrected history image includes not only the history image 65 generated by use of only the corrected bird's-eye-view image, but also the history image 65 generated by use of both the corrected bird's-eye-view image and the captured bird's-eye-view image not having the irradiation light. Note that, the corrected history image is an image in which the influence of the irradiation light is reduced compared with the history image 65 generated based on the captured bird's-eye-view image having the irradiation light.

The image processing unit 50 generates a corrected bird's-eye-view image that is a bird's-eye-view image obtained by combining the corrected history image and the latest captured bird's-eye-view image as a display bird's-eye-view image (step S29). At this time, the image processing unit 50 extracts a portion included in the vehicle peripheral range 62 from the corrected history image stored in the history region 330. The image processing unit 50 stores the extracted image in a display region 340 that is a predetermined storage region provided in the storage unit 30. The image processing unit 50 stores, in the display region 340, the latest captured bird's-eye-view image that has been read out from a actual region 320 and corresponds to each of the front camera 110 and the rear camera 120, and overwrites the latest captured bird's eye image on the image extracted from the corrected history image. The image processing unit 50 stores the icon 61 indicating the own vehicle in the display region 340, and overwrites the icon 61 on the combined image of the corrected history image and the latest captured bird's-eye-view image. In the display control processing according to the present embodiment, such image combining processing generates a corrected display image as shown in FIG. 2.

The image processing unit 50 displays the corrected display image stored in the display region 340 on the display unit 40 (step S30). The image processing unit 50 terminates the difference processing after executing the processing of step S30.

[2.3. Mask Processing]

Next, the above-described mask processing executed in step S16 will be described with reference to a flowchart of FIG. 5.

Note that, processing of steps S41 to S45 in the mask processing is the same as the processing of steps S21 to S25 in the above-described difference processing, and therefore its description will be omitted.

The image processing unit 50 extracts a portion necessary for generating a display bird's-eye-view image from each of the latest forward captured bird's-eye-view image and backward captured bird's-eye-view image, which have been generated by the processing of step S43 (step S46).

The image processing unit 50 stores the extracted image in the history region 330 (step S47). At this time, the image processing unit 50, in a state in which the history image 65 is stored in the history region 330, overwrites the latest captured bird's-eye-view image on the captured history image, as the history image 65 stored in the history region 330. This combines the captured history image and the latest captured bird's-eye-view image to update the captured history image.

The captured history image referred to herein is a bird's-eye-view image obtained by combining captured bird's-eye-view images sequentially generated by the processing of step S43 while shifting positions of the captured bird's-eye-view images on the basis of the movement amount of the own vehicle. The captured history image is generated as the history image 65 in the history region 330. The irradiation light is present in at least one of the forward captured bird's-eye-view image and backward captured bird's-eye-view image to be combined. Hence, in the captured history image, the irradiation light is expanded along with the movement of the own vehicle. Thus, in the display control processing according to the present embodiment, the captured history image is updated by being combined with the latest captured bird's-eye-view image by the processing of step S47.

The image processing unit 50 extracts a portion included in the vehicle peripheral range 62 from the captured history image stored in the history region 330, and stores the extracted image in the display region 340 (step S48).

The image processing unit 50 detects a region occupied by the irradiation light (hereinafter, referred to as a "light region") in a captured history portion 66 of a captured history image shown in FIG. 9, and stores the light region when it is detected (step S49).

The captured history portion 66 referred to herein is a portion configured by using the past captured bird's-eye-view image of the captured history images stored in the display region 340. In other words, the captured history portion 66 is a portion in which the captured history image before combined with the latest captured bird's-eye-view image appears, in the captured history image. That is, the image processing unit 50 detects the light region for a portion having the irradiation light that has been expanded by the processing of step S49. In other words, the processing of step S49 detects the light region for a portion in which the irradiation light present in the past captured bird's-eye-view image appears. Note that, as will be described below, the captured history portion 66 corresponds to a history portion of the display bird's-eye-view image.

In the display control processing according to the present embodiment, the detection of the light region is performed as follows. Specifically, the image processing unit 50 performs region division on a part of the captured history portion 66 on the basis of hue and brightness. The image processing unit 50 extracts two regions adjacent to each other in which a hue difference is a predetermined value or less and a brightness difference is a predetermined value or more, of a plurality of the divided regions. The image processing unit 50 sets, of the extracted two regions, a region having a high brightness as a light region and a region having a low brightness as a non-light region. The image processing unit 50 specifies a vector from the light region to the non-light region in a space of color information as color information of a light source. The image processing unit 50 performs region division on a whole region of the captured history portion 66 on the basis of hue and brightness. The image processing unit 50 specifies, of the adjacent regions, a region having a high brightness as a light region in a case where the hue difference between the regions adjacent to each other coincides with the hue of the light source in a predetermined range.

Figure 9:
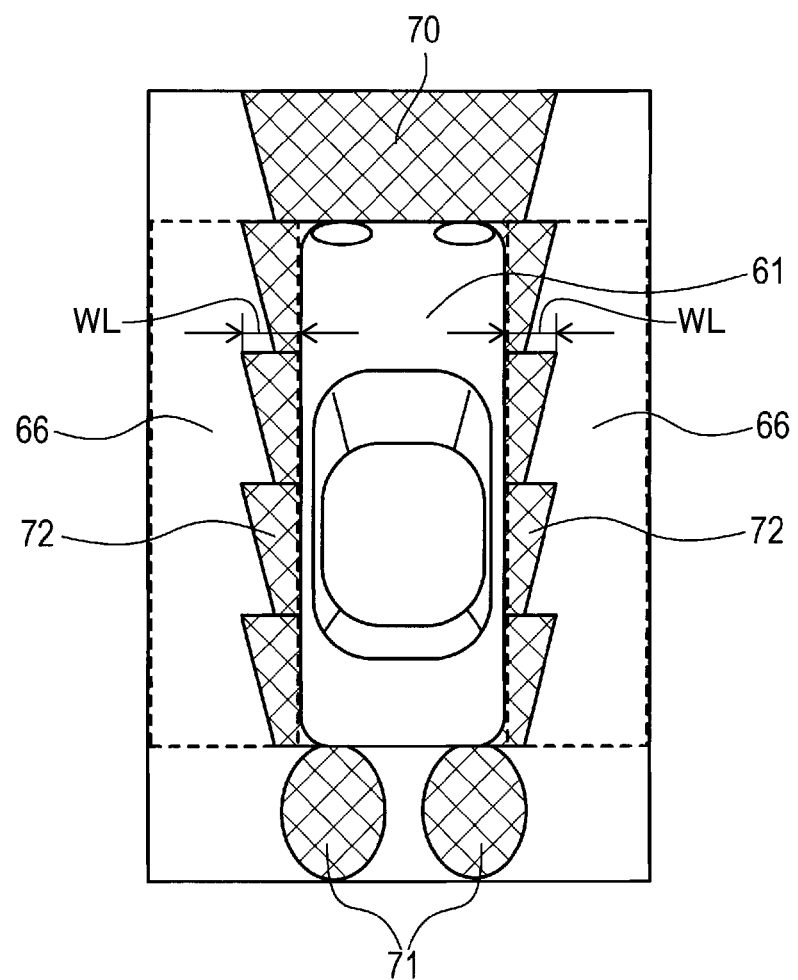
FIG. 9 is a diagram representing one example of a bird's-eye-view image in which light of the head lamp has been expanded along with the movement of a vehicle.

For example, in a status in which the own vehicle advances straight with the head lamp turned on, as shown in FIG. 9, the irradiation light that has been expanded, appears in the captured history image. Specifically, light 72 of the head lamp, which has been expanded, appears at a position, in the captured history portion 66, adjacent to the right and left sides of the icon 61 indicating the own vehicle. In the display control processing according to the present embodiment, the processing of step S49 is executed to detect the light 72 of the head lamp.

In the display control processing according to the present embodiment, under the condition that the captured history portion 66 is completely filled with the past captured history image as a result of expansion of the captured history image stored in the history region 330 along with the movement of the own vehicle, the processing of step S49 is executed just once. Note that, in the display control processing according to the present embodiment, the following determination may be performed, for example, based on the movement amount of the own vehicle after the start of the display control processing. It determines whether the captured history portion 66 (a history portion of the display bird's-eye-view image) is completely filled with the past captured history image (the past bird's-eye-view image).

The image processing unit 50 generates, as a display bird's-eye-view image, a mask display image that is a bird's-eye-view image obtained by masking a predetermined region including the light region stored by the processing of step S49, in the captured history portion 66 (step S50). At this time, the image processing unit 50 masks the predetermined region by filling the predetermined region including the light region with a color (black or the like) which is displayed on the display unit 40 and allows a user to notice intentional removal when the user visually recognizes the display.

As described above, in the display control processing according to the present embodiment, the processing of step S49 is executed just once, and the light region at the time of execution is stored. Thus, the image processing unit 50 repeatedly refers to the light region stored by the processing of step S49 each time it executes the processing of step S50. The image processing unit 50 decides the mask region (region to be masked) to include the referred light region according to a predetermined condition. The image processing unit 50 masks the decided region. The condition referred to herein is a condition such as setting a rectangular region expanded to a predetermined size to a mask region on the basis of the minimum region including the light region. That is, the condition is that the mask region is decided unambiguously for the light region. Therefore, when the mask display image is displayed on the display unit 40 by processing of step S51 to be described below, the mask region is fixed onto the screen of the display unit 40 (does not change along with the movement of the own vehicle). The reason for fixing the mask region onto the screen of the display unit 40 like this is to avoid frequent change of the mask region on the screen of the display unit 40 due to periodical execution of the processing of step S50. Note that, in the display control processing according to the present embodiment, the icon 61 indicating the own vehicle is overwritten on the masked captured history image. In addition, in the display control processing according to the present embodiment, the captured history image is not masked until the light region is stored by the processing of step S49.

In the display control processing according to the present embodiment, the mask region is set to be larger than the minimum region including the irradiation light. The reason for setting the mask region like this is that in a case where the own vehicle moved while turning right and left (horizontal direction), the irradiation light having appeared in the captured history portion 66 appears at a position different from that in a case where the own vehicle moved only back and forth (vertical direction).

Figure 10:
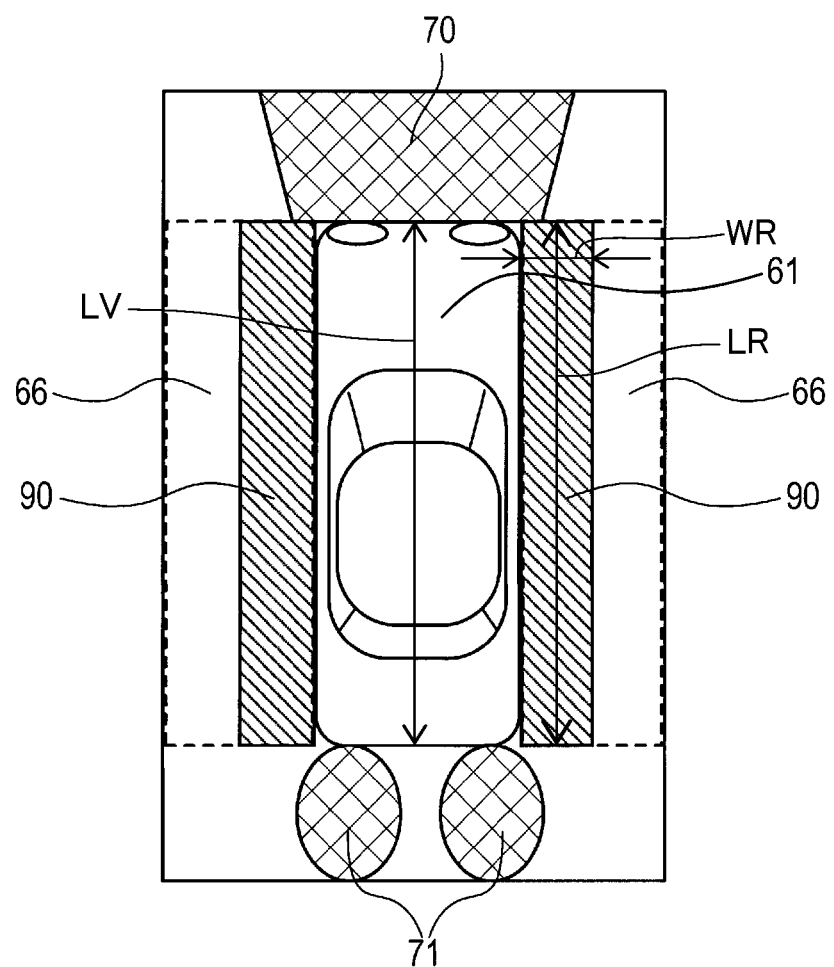
FIG. 10 is a diagram representing one example of a bird's-eye-view image which is generated in the mask processing and displayed on the display unit.

For example, in a status in which the own vehicle is advancing straight, as shown in FIG. 10, two rectangular regions adjacent to the right and left sides of the own vehicle are masked to form mask regions 90. Specifically, a region is masked in which a length LR of the region in the vertical direction (longitudinal direction) is equal to a front-to-rear length LV of the own vehicle, and thereby the mask region 90 is formed. A length WR (width in right and left) of the mask region 90 in the horizontal direction is set to be larger than a width WL in right and left of the light 72 of the head lamp shown in FIG. 9.

The image processing unit 50 displays the mask display image generated by the processing of step S50 on the display unit 40 (step S51). The image processing unit 50 terminates the mask processing after executing the processing of step S51.

3. Effect

According to the present embodiment described above in detail, an effect described below can be obtained.

(3a) In the present embodiment, the image processing unit 50 generates the corrected bird's-eye-view image that is a bird's-eye-view image from which the irradiation light of the own vehicle has been removed. Specifically, the image processing unit 50 calculates differences between the captured bird's-eye-view image having the irradiation light and the two types of images for difference 80, 81 to generate the corrected bird's-eye-view image as the image representing the differences. The image processing unit 50 generates the corrected display image to be displayed on the display unit 40 as the display bird's-eye-view image, by using the corrected history image generated based on the sequentially-generated corrected bird's-eye-view images. In this way, the image processing unit 50 generates the display bird's-eye-view image to be displayed on the display unit 40, by using the corrected history image generated based on the corrected bird's-eye-view image from which the irradiation light has been removed, instead of the history image 65 generated based on the captured bird's-eye-view image having the irradiation light. The image processing unit 50 displays the generated mask display image on the display unit 40. Therefore, the display control device according to the present embodiment can prevent expansion of the irradiation light of the vehicle on the image of the display unit 40.

(3b) In the present embodiment, the image processing unit 50 changes the difference amounts between the captured bird's-eye-view image and the two types of images for difference 80, 81 on the basis of the operation by the user. Thereby, the display control device according to the present embodiment, when calculating the difference, can adjust the difference amount to an appropriate amount, instead of subtracting too much or too little of a pixel value from the image having the irradiation light.

(3c) In the present embodiment, the image processing unit 50 executes, in the display control, the mask processing instead of the difference processing. In the mask processing, the image processing unit 50 generates the captured history image on the basis of the sequentially-generated captured bird's-eye-view images. The image processing unit 50 detects, in the bird's-eye-view image obtained by combining the captured history image and the latest captured bird's-eye-view image, the light region for the captured history portion 66 in which the captured history image before combining appears. The image processing unit 50 masks a predetermined region including the detected light region to generate a mask display image that is a bird's-eye-view image from which the irradiation light has been removed as the display bird's-eye-view image. The image processing unit 50 displays the generated mask display image on the display unit 40. Thereby, the display control device according to the present embodiment can prevent the irradiation light that has been expanded along with the movement of the own vehicle, from being displayed in an image on the display unit 40.

Further, the mask processing uniformly fills the predetermined region including the light region with black or the like (color allowing a user to notice intentional removal) regardless of lightness or the like around the own vehicle. Therefore, adjustment of the difference amount by the user, as performed in the difference processing, becomes unnecessary.

Note that, in the present embodiment, the display unit 40 corresponds to a display device, the image processing unit 50 corresponds to the display control device, and the front camera 110 and the rear camera 120 correspond to the in-vehicle camera. Further, the light 70 of the head lamp and the light 71 of the tail lamp correspond to the irradiation light of the vehicle, the light 72 of the head lamp expanded corresponds to a removal target, and the two types of images for difference 80, 81 correspond to the second difference image. Further, the processing of step S14 corresponds processing performed by a difference changing unit. Further, the processing of steps S21 and S41 corresponds processing performed by the acquisition unit, and the processing of steps S23 and S43 corresponds processing performed by the first image generation unit. Further, the processing of steps S24 and S44 corresponds processing performed by the calculation unit, and the processing of step S26 corresponds processing performed by the second image generation unit. Further, the processing of steps S25, S27, and S28 corresponds processing performed by the corrected history generation unit, the processing of steps S29 corresponds processing performed by the corrected display generation unit, and the processing of steps S30 corresponds processing performed by the corrected display processing unit. Further, the processing of steps S45, S46, and S47 corresponds processing performed by the captured history generation unit, the processing of steps S50 corresponds processing performed by the mask display generation unit, and the processing of steps S51 corresponds processing performed by the mask display processing unit.

4. Other Embodiments

Embodiments for carrying out one aspect of the technology of the present disclosure has been described above, but the technology of the present disclosure is not limited to the above-described embodiments. The technology of the present disclosure can be variously modified and carried out as described below.

(4a) The above embodiment shows an example in which the image processing unit 50 calculates differences between the captured bird's-eye-view image and the two types of images for difference 80, 81 after applying bird's-eye-view conversion to the captured image. However, a timing for calculating the differences is not limited to this. For example, the image processing unit 50 may calculate the differences before applying the bird's-eye-view conversion. Specifically, the image processing unit 50 may calculate the difference between the captured image having the irradiation light and the difference image that is the image representing a change in the pixel value of the captured image by the irradiation light. In other words, the image processing unit 50 may calculate the difference between the captured image having the irradiation light and the difference image that is the image representing a difference in the pixel value of the captured image between presence and absence of the irradiation light. In this case, the corrected bird's-eye-view image may be generated as the image obtained by applying the bird's-eye-view conversion to the image representing the difference between the captured image having the irradiation light and the difference image.

(4b) The above embodiment shows an example in which the image processing unit 50, when calculating the difference from the captured image having the irradiation light, uses the two types of images for difference 80, 81 preliminarily stored in the storage unit 30. However, the difference image to use is not limited to this. For example, the image processing unit 50 may generate an difference image at the driving time of the own vehicle to use the generated difference image. In this case, the image processing unit 50 may use, as the difference image, the two captured images (for example, images captured just before or just after lighting of the head lamp or the like) having almost the same capturing target except presence/absence of the irradiation light, or the image representing a difference between bird's-eye-view images thereof.

(4c) The above embodiment exemplifies the light 70 of the head lamp and the light 71 of the tail lamp as the irradiation light of the vehicle. However, the irradiation light of the vehicle is not limited to these. The irradiation light may be light of a brake lamp or the like.

(4d) The above embodiment shows an example in which in the mask processing in the display control, the mask region 90 is set to be larger than the minimum region including the irradiation light. However, the mask region is not limited to this. For example, the mask region may be set as a region including only the irradiation light.

(4e) The above embodiment shows an example in which the image processing unit 50 generates the mask display image by detecting the light region just once, storing it, and masking the region decided according to the predetermined condition so as to include the stored light region. However, a method for generating the mask display image is not limited to this.

For example, the image processing unit 50 detects the light region in the latest captured bird's-eye-view image, and masks the region including the detected light region. Then, the image processing unit 50 generates the history image by using the masked latest captured bird's-eye-view image, and overwrites the latest captured bird's eye image on a portion that is extracted from the generated history image and included in the vehicle peripheral range 62. The image processing unit 50 may generate the mask display image with such a method. That is, the image processing unit 50 may generate the display bird's-eye-view image in which the light region is replaced with the mask region.

In addition, at the start of the display control processing, the processing detects, in the history portion of the display bird's-eye-view image displayed on the display unit 40, the light region for each of the past captured bird's-eye-view images appearing along with the movement of the own vehicle, and masks the region including the light region. Then, in the display control processing, when the history portion of the display bird's-eye-view image is completely filled with the past captured bird's-eye-view image on the image of the display unit 40, the mask region at that time point may be maintained. That is, in the above embodiment, the masked display bird's-eye-view image is not displayed until the captured history portion 66 of the captured history image is completely filled with the past captured history image. However, in the above-described display control processing, the masked display bird's-eye-view image may be displayed even before the captured history portion 66 is completely filled with the captured history image.

Further, the image processing unit 50 may generate the mask display image by masking a predetermined region without detecting the light region (regardless of how the irradiation light appears in the history portion of the display bird's-eye-view image).

(4f) The above embodiment exemplifies the irradiation light of the own vehicle as a removal target to be removed by being masked, but the removal target is not limited to this. For example, the removal target may be a shadow of the own vehicle.

(4g) The above embodiment shows an example in which the image processing unit 50 selects and executes one of the difference processing and the mask processing. However, the processing to be executed is not limited to this. For example, the image processing unit 50 may execute only one of the difference processing and the mask processing.

(4h) The above embodiment shows an example in which the image processing unit 50, in the processing of step S11, determines that the difference image exists only in a case where both of the two types of images for difference 80, 81 are stored. However, the determination criterion is not limited to this. For example, the image processing unit 50 may determine that the difference image exists, not only in a case where both of the two types of images for difference 80, 81 are stored, but also in a case where only one of the two types of images for difference 80, 81 is stored. In this case, the image processing unit 50 may execute the difference processing for subtracting the influence of the lamp determined that the corresponding difference image exists of the light 70 of the head lamp and the light 71 of the tail lamp.

(4i) The above embodiment shows an example in which the front camera 110 and the rear camera 120 are mounted in the own vehicle. However, the mounting status of camera is not limited to this. For example, a configuration may be used in which only one of the front camera 110 and the rear camera 120 is mounted in the own vehicle.

Further, a configuration may be used in which in addition to the front camera 110 and the rear camera 120, a camera is provided also in each of the right and left sides of the own vehicle, and four cameras in total are mounted in the own vehicle. With such a configuration, for example, in a case where there are no specific problems in all the four cameras, the history images may not be combined. In addition, in a case where a problem, such as image sticking, has occurred in any of the four cameras, the history images may be combined to fill the bird's-eye-view image of an image captured by the camera with the problem.

(4j) The above embodiment exemplifies, as a display device, the display unit 40 that is a display provided in the own vehicle. However, the display device is not limited to this. Another example of the display device includes an HUD (Head Up Display).

(4k) In the above embodiment, a part or all of the processing executed by the image processing unit 50 are not limited to a configuration for realizing the image processing by software, such as a program. For example, a configuration for realizing the image processing by hardware, such as one or more ICs, may be used.

(4l) A function of one component in the above embodiment may be distributed as a plurality of components. In addition, functions of a plurality of components in the above embodiment may be integrated into one component. Further, a part of the configuration in the above embodiment may be omitted. Further, at least part of the configuration in the above embodiment may be added to or replaced with the configuration of another embodiment. Note that, the embodiments of the present disclosure are targeted to any aspect included in technical ideas specified only by wording described in Claims.

(4m) The technology of the present disclosure can be supplied in following various forms other than the above-described image processing unit 50. Specifically, the various forms include a system with the image processing unit 50 as a component, a program for causing a computer to function as the image processing unit 50, a recording medium, such as a semiconductor memory, having the program recorded therein, a method for removing the irradiation light present in the captured image or captured bird's-eye-view image by differentiating or masking, and the like.

REFERENCE SIGNS LIST

1 . . . Display control system
10 . . . Capturing unit
20 . . . Movement information output unit
30 . . . Storage unit
40 . . . Display unit
50 . . . Image processing unit
62 . . . Vehicle peripheral range
80, 81 . . . Difference Image
90 . . . Mask region
110 . . . Front camera
120 . . . Rear camera
310 . . . Difference region
320 . . . Actual region
330 . . . History region
340 . . . Display region

The invention claimed is:

1. A display control device for displaying, on a display mounted in a vehicle, a captured image of a predetermined range in a periphery of the vehicle, the display control device comprising:
a microcomputer communicable with the display; and
an electronic storage accessible by the microcomputer, the microcomputer being configured to:
sequentially acquire, as the captured image, captured images from an in-vehicle camera mounted in the vehicle;
sequentially generate captured bird's-eye-view images, each of which is a bird's-eye-view image of a corresponding one of the captured images;
sequentially generate corrected bird's-eye-view images, each of which is a bird's-eye-view image of a corresponding one of the captured images, so that, from each corrected bird's-eye-view image, irradiation light of the vehicle that is present in the corresponding one of the captured images has been removed from a corresponding one of the corrected bird's-eye-view images, the irradiation light of the vehicle comprising light that irradiates from the vehicles;
calculate a movement amount of the vehicle;
generate a corrected history image that is a bird's-eye-view image obtained by combining the corrected bird's-eye-view images while shifting positions of the corrected bird's-eye-view images based on of the movement amount;
generate a corrected display image that is a bird's-eye-view image obtained by combining the corrected history image and a latest captured bird's-eye-view image; and
control the display to display the corrected display image on the display, the display control device being further configured to:
generate, as each corrected bird's-eye-view image, at least one of:
a bird's-eye-view image obtained by applying bird's-eye-view conversion to an image representing a difference between a corresponding captured image having the irradiation light and a first difference image that is an image representing a change in a pixel value of the corresponding captured image by the irradiation light; and
a bird's-eye-view image representing a difference between a corresponding captured bird's-eye-view image having the irradiation light and a second difference image that is an image representing a change in a pixel value of the corresponding captured bird's-eye-view image;
generate a captured history image that is a bird's-eye-view image obtained by combining the captured bird's-eye-view images while shifting positions of the captured bird's-eye-view images based on of the movement amount;
mask at least a removal target region in the captured history image by filling the removal target region with a predetermined color;
combine the captured history image having the masked removal target region with a latest captured bird's-eye-view image to thereby generate a mask display image that is a bird's-eye-view image; and
control the display to display the mask display image on the display.

2. The display control device according to claim 1, wherein the microcomputer is configured to, when generating each corrected bird's-eye-view image, change at least one of a difference amount between the corresponding captured image and the first difference image and a difference amount between a corresponding captured bird's-eye-view image and the second difference image, based on of an operation by a user.

3. The display control device according to claim 1, wherein:
the vehicle includes, as the in-vehicle camera, a front camera for capturing a predetermined range in front of the vehicle in the periphery of the vehicle, and a rear camera for capturing a predetermined range behind the vehicle in the periphery of the vehicle; and
the microcomputer is configured to:
generate, as each corrected bird's-eye-view image, a forward corrected bird's-eye-view image that is a bird's-eye-view image of a corresponding one of forward captured images captured by the front camera as the captured images, the irradiation light of the vehicle present in the corresponding one of the forward captured images has been removed from the corresponding one of the forward corrected bird's-eye-view image; and
generate, as each corrected bird's-eye-view image, a rear corrected bird's-eye-view image that is a bird's-eye-view image of a corresponding one of rear captured images captured by the rear camera as the captured images, the irradiation light of the vehicle present in the corresponding one of the rear captured images has been removed from the corresponding one of the rear corrected bird's-eye-view image.

4. A display control method in a display control device for displaying, on a display mounted in a vehicle, a captured image in a predetermined range in a periphery of the vehicle, the display control method comprising:
sequentially acquiring, as the captured image, captured images from an in-vehicle camera mounted in the vehicle;
sequentially generating captured bird's-eye-view images, each of which is a bird's-eye-view image of a corresponding one of the captured images;
sequentially generating corrected bird's-eye-view images, each of which is a bird's-eye-view image of a corresponding one of the captured images, so that, from each corrected bird's-eye-view image, irradiation light of the vehicle that is present in a corresponding one of captured images has been removed from a corresponding one of the corrected bird's-eye-view images, the irradiation light of the vehicle comprising light that irradiates from the vehicle;

calculating a movement amount of the vehicle;

generating a corrected history image that is a bird's-eye-view image obtained by combining the corrected bird's-eye-view images while shifting positions of the corrected bird's-eye-view images based of the movement amount;

generating a corrected display image that is a bird's-eye-view image obtained by combining the corrected history image and a latest captured bird's-eye-view image; and controlling the display to display the corrected display image on the display;

the display control method further comprising:

generating, as each corrected bird's-eye-view image, at least one of:

a bird's-eye-view image obtained by applying bird's-eye-view conversion to an image representing a difference between a corresponding captured image having the irradiation light and a first difference image that is an image representing a change in a pixel value of the corresponding captured image by the irradiation light, and a bird's-eye-view image representing a difference between a corresponding captured bird's-eye-view image having the irradiation light and a second difference image that is an image representing a change in a pixel value of the corresponding captured bird's-eye-view image;

generating a captured history image that is a bird's-eye-view image obtained by combining the captured bird's-eye-view images while shifting positions of the captured bird's-eye-view images based on of the movement amount;

masking at least a removal target region in the captured history image by filling the removal target region with a predetermined color;

combining the captured history image having the masked removal target region with latest captured bird's-eye-view image thereby generating a mask display image that is a bird's-eye-view image; and controlling the display to display the mask display image on the display.

5. The display control device according to claim 1, wherein a mask region of the mask display image is fixed on a screen of the display.

* * * * *